Figure 3:
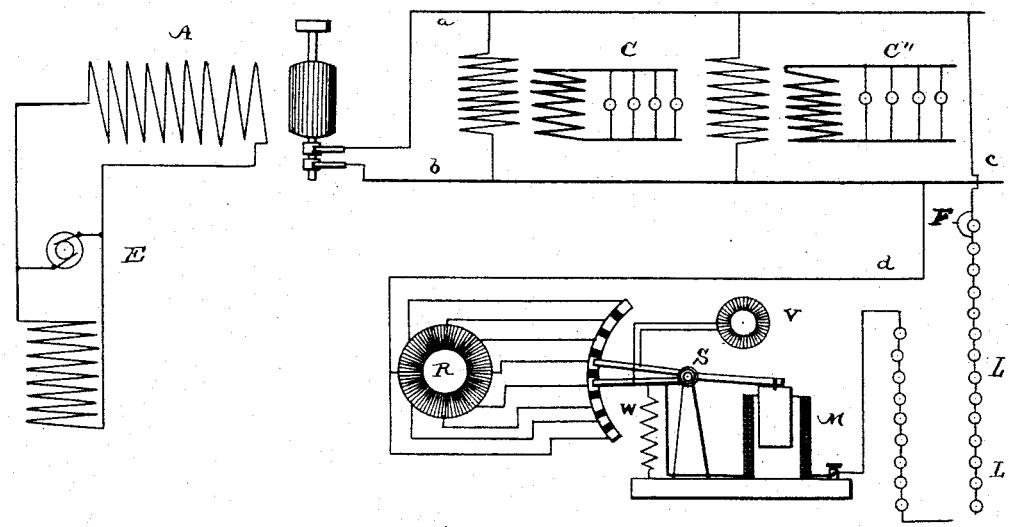

(No Model.) 2 Sheets—Sheet 1.
E. THOMSON & E. W. RICE, Jr.
SYSTEM OF ELECTRICAL DISTRIBUTION.
No. 413,293. Patented Oct. 22, 1889.
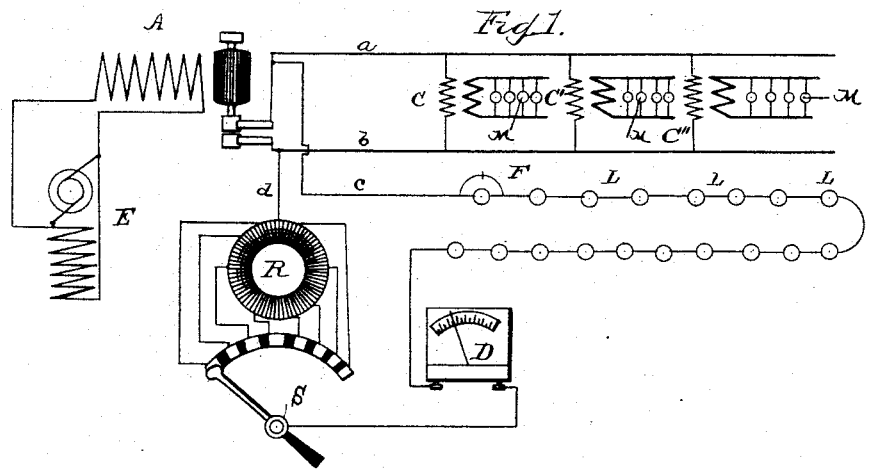
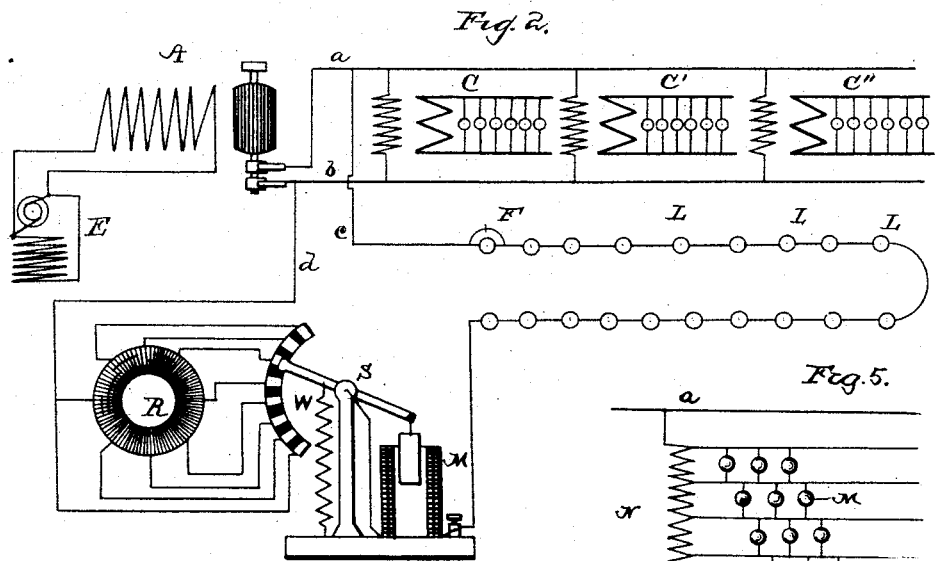
WITNESSES:
Ira R. Steward
Wm H. Capel
INVENTORS
ELIHU THOMSON
E. WILBUR RICE, Jr.
BY
Townsend & MacArthur
ATTORNEYS (No Model.) 2 Sheets—Sheet 2.

E. THOMSON & E. W. RICE, Jr.
SYSTEM OF ELECTRICAL DISTRIBUTION.

No. 413,293. Patented Oct. 22, 1889.

WITNESSES:
Ira R. Steward
[signature]

INVENTORS
ELIHU THOMSON.
E. WILBUR RICE JR.
BY
Townsend & McArthur
ATTORNEYS

UNITED STATES PATENT OFFICE.

ELIHU THOMSON AND EDWIN WILBUR RICE, JR., OF LYNN, MASSACHUSETTS.

SYSTEM OF ELECTRICAL DISTRIBUTION.

SPECIFICATION forming part of Letters Patent No. 413,293, dated October 22, 1889.

Application filed July 30, 1888. Serial No. 281,410. (No model.)

*To all whom it may concern:*

Be it known that we, ELIHU THOMSON and EDWIN WILBUR RICE, Jr., citizens of the United States, and residents of Lynn, in the county of Essex and State of Massachusetts, have invented certain new and useful Systems of Electrical Distribution, of which the following is a specification.

Our invention relates to systems of electric distribution generally, but is primarily designed for use in those systems employing alternating currents.

The object of our invention is to run electric lamps—such, for instance, as incandescent lamps or other translating devices—in a series circuit on the same system with other translating devices run in multiple.

A further object of our invention is to run series incandescent or arc lamps from the same source of supply as incandescent lamps run in multiple.

To these ends our invention consists in a system of electric distribution comprising constant potential mains, translating devices of any desired character in multiple between said mains, a circuit connected across said mains and containing translating devices in series, and a current-regulator in said series circuit.

Our invention consists, further, in a system of distribution comprising a series incandescent-lamp circuit placed between mains of constant potential, means for keeping the current of said series circuit constant on the extinguishment of series lamps, transformers or compensators, as will be hereinafter described, connected in multiple across the mains, and translating devices supplied in multiple from said transformers or compensators.

Our invention consists, further, in the novel system of distribution hereinafter described, and comprising alternating-current mains of constant potential, a circuit containing translating devices in series between said mains, means for keeping the current of said circuit constant, transformers connected in multiple from said mains, and incandescent lamps or other translating devices supplied in multiple from said transformers.

Our invention consists, further, in certain novel combinations or systems of apparatus, more specifically indicated in the claims.

In the accompanying drawings, in Figures 1, 2, 3, and 4, we have shown diagrammatically systems of distribution embodying our invention, but different from one another in details. Fig. 5 illustrates a modification.

A indicates any source of electric currents adapted to supply to mains $a\,b$ electric energy of constant potential. In the present instance we have indicated an alternating-current dynamo. The field of such dynamo may obviously be supplied from the armature of the machine itself, or may be separately excited, as indicated, by a dynamo E, charging the field-magnet of the machine which supplies current to the mains $a\,b$. Between the mains $a\,b$ are connected at C C' C², in multiple, translating devices of any desired character.

In Fig. 1 we have shown translating devices consisting of electric converters adapted to translate the high potential energy on mains $a\,b$ into energy of lower potential, but greater quantity on the local circuits adapted to supply translating devices M, connected in multiple to distributing-wires leading from the secondaries of the converters. The translating devices M may be incandescent lamps, as indicated, or of any other desired character. In a circuit $c\,d$, supplied also from the mains $a\,b$, are indicated a number of translating devices L L, placed in series with one another, so as to produce what is known in the art as a "series circuit." The translating devices L may be what is known as "series incandescent lamps," or other forms of lamps or translating devices adapted to run in series with one another between the mains $a\,b$. The devices L are supposed to be provided with some appliance by means of which, in case of extinguishment of the lamp or interruption of the circuit through the same, a shunt or substitute path, as indicated at F, will be provided for the current flowing on the series circuit. Devices of this character for application to what are known as "series incandescent lamps," and adapted to automatically furnish a path for the current in case of rupture of the carbon incandescent element, are now well known in the art. The translating devices L may obviously have the usual auxiliaries known in the art whereby they may be designedly thrown out of operation.

In the series circuit c d, Fig. 1, we have shown a current-indicator D, adapted to indicate the amount of current flowing at any time through the circuit c d from one main a to the other b. In the circuit c d we interpose a regulator of the current flowing, which regulator may be of any desired character. In the case of constant currents it may be a plain electric resistance without substantial self-induction, while in the case of alternating currents we may employ an artificial resistance to the flow, consisting of a coil having large self-induction and variable by the use of a switch that shall vary the number of coils in circuit, or adapted by any other regulating means known in the art to oppose the flow of the alternating currents in amount depending upon the resistance in the circuit. In the present case we have shown a current-regulator consisting of a reactive coil R, wound in sections and variable by the action of a switch S, which throws the sections of coil into and out of the circuit c d. Should a lamp L be extinguished from any cause, the current flowing through the series circuit c d, inasmuch as it is derived from a source of constant potential, would obviously be increased and the remaining lamps be given an abnormal incandescence. The indicator D will show this increased flow, and the current-regulator R may be manipulated to bring the current back to its normal amount.

It will of course be understood that the translating devices L, consisting of the incandescent lamps, are distributed through a territory more or less remote from the source of supply A, and that the mains a b likewise lead out from the station where the dynamo A is located to any desired distance.

By our system it is obvious that series incandescent lamps may be run in any desired locations from the same system which is employed to supply other translating devices in multiple from constant-potential mains, such other translating devices being distributed, as desired, over the territory to be covered from a source of supply A.

We do not limit ourselves to the use of the particular translating devices C C' C², since it is obvious that other translating devices might be supplied in multiple between the mains a b. When incandescent lamps of ordinary capacity are to be supplied from the same source A as the lamps L L, we place them in multiple, as indicated at M, between circuits or wires connected to the transformer indicated. In place of transformers supplying the incandescent lamps in multiple, as indicated in Fig. 1, we may use a compensating reactive coil, described in the patent of Elihu Thomson, No. 360,125, and connect to such coil a series of local supply-circuits, as indicated in Fig. 5, each of said circuits serving to supply incandescent lamps in multiple.

It is obvious that in place of the lamps M other translating devices of the same capacity might be substituted in multiple.

While the current-regulator is shown as operated by hand in Fig. 1, it is obvious that it might be operated automatically, as indicated in Fig. 2, by means of an electro-magnet M, placed in the circuit c d and having its core, armature, or equivalent portion connected to the switch S or other device operating on the current-regulator.

The usual retracting device W would be obviously applied to the switch S. In this case an increase of current flowing through the mains c d would cause the magnet M to draw down its armature or core, and thus operate the switch S in a manner to vary the reaction or resistance in the circuit to a predetermined amount, thus restoring the current to normal.

In Figs. 1 and 2 the arrangement of the arm S and contact-pieces is such that in passing from one contact to another the circuit c d is ruptured. To avoid this we propose to use a double arm, parts of which are insulated from one another, and are connected with an auxiliary reactive coil V, as indicated in Fig. 3. This device forms the subject of a patent to E. W. Rice, Jr., No. 381,420, and need not therefore be herein more particularly described.

Figure 4:
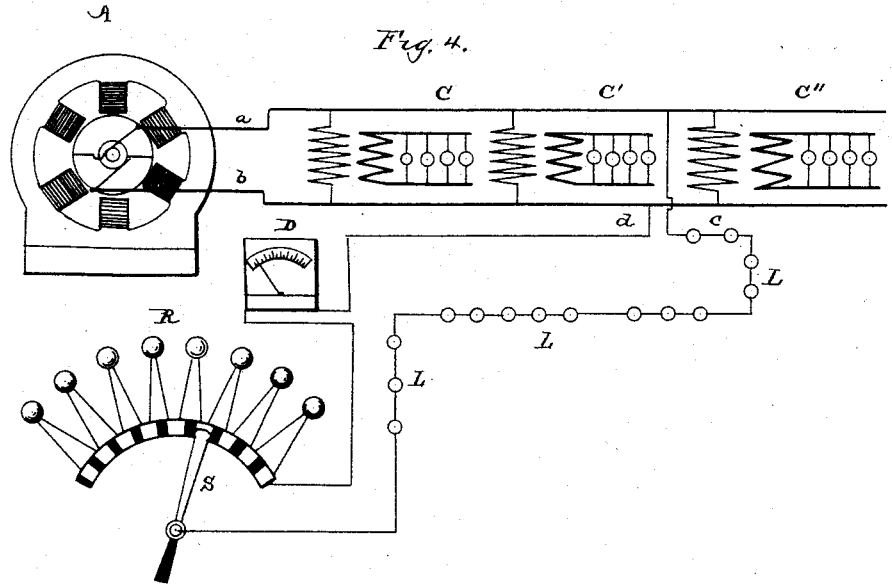

In Fig. 4 the artificial resistance or current regulator is composed of a number of incandescent lamps R, disposed in such manner that one or more of them may be inserted into the circuit c d, according as the lamps L on the circuit are extinguished. The insertion of lamps at R obviously will operate to keep the current in the circuit constant. The operation may be performed by hand or automatically by such a device as indicated in Fig. 2.

What we claim as our invention is—

1. A system of electric distribution comprising constant-potential mains having translating devices of any desired character in multiple between them, a series circuit of distribution connected across said mains and containing translating devices in series, and a current-regulator in said series circuit.

2. In a system of distribution of electric light comprising a series incandescent-lamp circuit connected across mains of constant potential, means connected with said series circuit for keeping the current on the same constant upon the extinguishment of series lamps, and transformers or compensators connected in multiple across the constant-potential mains, and having sub-circuits supplying translating devices in multiple.

3. The herein-described system of electric distribution, comprising alternating-current mains of constant potential, a series circuit containing translating devices—such as series lamps—means for keeping the current of said circuit constant, transformers or converters connected in multiple between said mains, and incandescent lamps or other translating devices supplied in multiple from said transformers.

4. In an alternating-current system of electric lighting, constant-potential mains having transformers or compensating coils connected in multiple between them, incandescent lamps supplied in multiple from sub-circuits connected to said transformers, a series circuit connected between said mains and containing incandescent series lamps, and a current-regulating device included in said series lamp circuit.

5. In a system of electric distribution, a source of alternating-current supply, constant-potential mains connected therewith, transformers or compensators arranged in multiple between said mains and having a sub circuit or circuits connected with them for supplying translating devices in multiple, a series circuit of distribution, also connected between said mains, a variable reactive coil in said circuit, and a device responsive to variations in the current of said circuit for adjusting the reactive coil in the manner described to keep the current constant.

6. In an alternating-current system of distribution, alternating-current mains of constant potential, translating devices of any desired character supplied in multiple between said mains, a series circuit of distribution containing translating devices in series, a variable reactive coil in the series circuit, and devices responsive to the variations in the current on said circuit for adjusting the reaction of said coil.

Signed at Lynn, in the county of Essex and State of Massachusetts, this 19th day of July, A. D. 1888.

ELIHU THOMSON.
E. WILBUR RICE, Jr.

Witnesses:
J. W. GIBBONEY,
J. R. VIETS, Jr.